Sept. 28, 1943.     S. H. BROOKS     2,330,552

LUBRICATED HINGED SHAFT JOINT

Filed Nov. 3, 1942

INVENTOR.
Stephen H. Brooks
BY
Lyman E. Dodge
ATTORNEY

Patented Sept. 28, 1943

2,330,552

UNITED STATES PATENT OFFICE 2,330,552

LUBRICATED HINGED SHAFT JOINT

Stephen H. Brooks, New York, N. Y., assignor to Brooks Equipment Corporation, New York, N. Y., a corporation of New York Application November 3, 1942, Serial No. 464,364

1 Claim. (Cl. 74—468)

This invention relates to machine elements, particularly coupling elements, and more especially power transmission means.

A principal object of this invention is the production of a device of the type specified which is so constructed that all parts may be easily, sufficiently, and properly lubricated.

A further object of the invention is the provision of a device of the type specified which will be simple in construction; readily built, easily installed and maintained, and durable and efficient in operation.

Further objects and advantages will appear as the description of the invention and particular physical embodiments selected to illustrate the invention progresses, and the novel features will be particularly pointed out in the appended claim.

Figure 1:
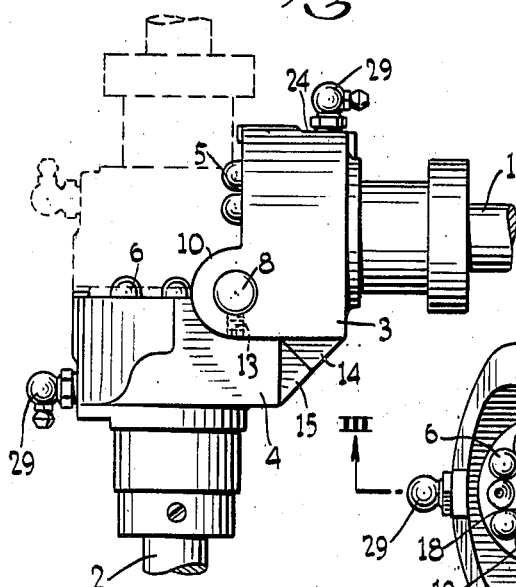
Figure 2:
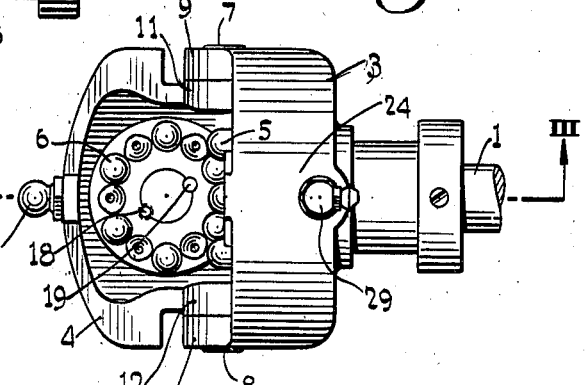
Figure 3:
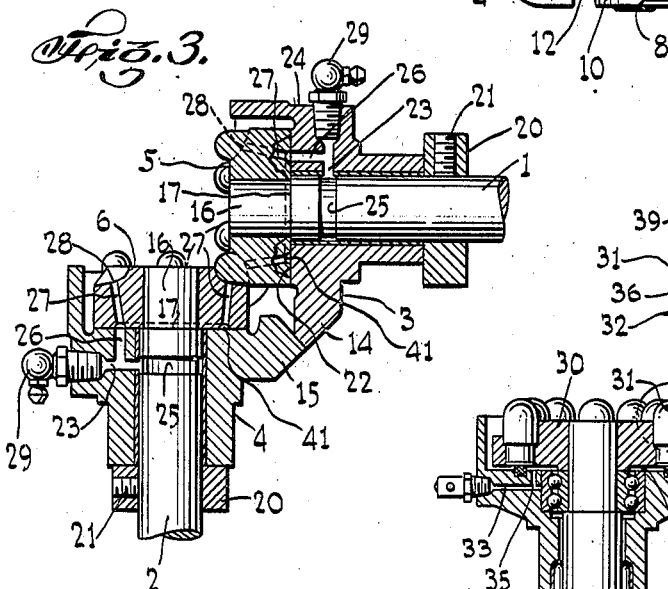
Figure 4:
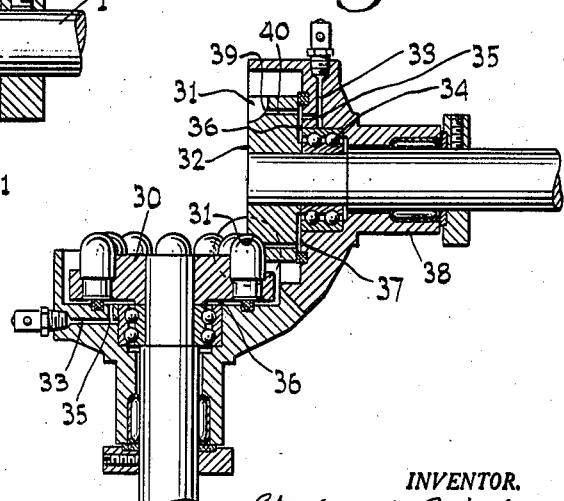

In describing the invention in detail, and the particular physical embodiments selected to illustrate the invention, reference will be had to the accompanying drawing and the several views thereon, in which, like characters of references designate like parts throughout the several views, and in which:

Figure 1 is a front elevational view of a hinged joint embodying my invention showing, in dash lines, an alternating position of one of the parts; Fig. 2 is a top plan view of the device as shown by Fig. 1; Fig. 3 is a cross-sectional view of the device as shown by Figs. 1 and 2 on the plane indicated by the line III—III of Fig. 2, viewed in the direction of the arrows at the ends of the line; Fig. 4 is a view corresponding to Fig. 3 but of a modified form of my invention.

Numeral 1 designates one shaft and numeral 2 designates another shaft. The two shafts are connected by what is known as flexible or hinged joint.

The hinged joint includes a housing 3 through which shaft 1 passes and a housing 4 through which shaft 2 passes.

Each shaft has a gear on the inner end thereof. Shaft 1 has the gear 5 thereon and shaft 2 has the gear 6 thereon. The particular form of gears shown are those illustrated in the patent to Erdman Number 2,261,901 dated November 4, 1941 although, of course, any suitable or appropriate gear may be used.

The housings 3 and 4 are connected by means of pins 7 and 8 passing through ears 9 and 10 on housing 3 and through ears 11 and 12 on housing 4. The pins 7 and 8 may be attached to one of the housings, as 3, as by a set screw 13 but will be free for relative rotation in the other housing, so that the two housings may pivot through substantially an angle of 90° one to the other, being limited in one direction by the faces of the gears or the gear teeth themselves and in the other direction by stops 14 and 15, one on housing 3 and the other on housing 4.

Each shaft is formed with a reduced end portion, as 16 forming a shoulder 17 against which the back of a gear abuts, the gear being held on the shaft by any suitable or appropriate means as by screw keys 18 and 19.

The shafts are provided with collars, as 20, which may be affixed at a proper position on a shaft as by a set screw 21 so that the back face of a gear, as 5, will properly bear on the internal face, as 22, of a housing.

For the purpose of lubricating the shafts and the gears, ducts are provided.

One duct, 23, is formed in the housing, as 3, at a right angle to the shaft 1 and extends from the outer face 24 of the housing to the shaft 1 where it joins with an annular groove 25 in the shaft.

Intermediate the shaft 1 and the outer face 24 a cross duct 26 is formed as a branch of duct 23. This duct extends to the inner face 17 of the housing and is so positioned as to aline with ducts as 27 passing through the gear and opening at the face 28 of a gear depression into which a tooth of the mating gear engages. It is preferred to provide as many gear ducts 27 as there are depressions for receiving teeth in the gear 5. These ducts 27 are connected by annular duct 41, which also communicates with 26.

In the end of the duct 23 any of the well known pressure lubricating fittings, such as 29, may be placed whereby lubricant may be forced into the ducts and be retained from flowing out through the outer end of the duct when pressure is removed.

By the construction above described a hinged joint coupling is provided with means whereby lubricant may be carried to a shaft, such as 1 and lubricate the surfaces thereof in contact with its bearing and, in addition, lubricant may be carried to the rear face of a gear, as 5 to lubricate it where it is in contact with the inner face of a housing, and, in addition, lubricant may be carried to each of the tooth receiving cavities of a gear.

In the modification shown in Fig. 4 one gear only has receptacles for teeth, that is, gear 30 has a plurality of teeth which intermesh with cavities 31 on gear 32. In this form the duct 33 corresponding to duct 23 of Fig. 3 conveys lubricant to the thrust ball bearing 34 by way of side branch 35 and space 36 between the rear face of the gear 32 and the inside face 37 of the housing 38. In this form the teeth receiving receptacles 39 have a duct 40 opening in their face this duct 40 is positioned to receive lubricant from the cross duct 35 and from space 36.

Although I have particularly described one particular physical embodiment of my invention, and a modification thereof, nevertheless, I desire to have it understood that the form selected is merely illustrative but does not exhaust possible physical embodiments of the idea of means underlying my invention.

The matter intended to be claimed in this application was described and shown in Fig. 8 of the drawing of the application which eventuated in the patent to S. H. Brooks, No. 2,281,913, dated May 5, 1942.

What I claim as new and desire to secure by Letters Patent of the United States, is:

In a lubricated shaft and gear, including, in combination: a housing formed with an orifice for receiving a shaft; a shaft positioned in the orifice; a gear formed with tooth receiving cavities on one face and a reduced portion on the opposite face attached to the end of the shaft, said gear formed with through ducts extending from the tooth receiving cavities to the opposite face reduced portion; means, including ducts in the housing, to lead lubricant to the reduced portion of the gear whereby lubricant is supplied to the cavities.

STEPHEN H. BROOKS.